UNITED STATES PATENT OFFICE.

CHARLES JEAN-BAPTISTE PAISSEAU-FEIL, OF PARIS, FRANCE.

COMPOSITION FOR USE IN MANUFACTURE OF ARTIFICIAL PEARLS AND FOR SIMILAR PURPOSES.

978,394.  Specification of Letters Patent.  Patented Dec. 13, 1910.

No Drawing.  Application filed October 6, 1909. Serial No. 521,309.

*To all whom it may concern:*

Be it known that I, CHARLES JEAN-BAPTISTE PAISSEAU-FEIL, of 53 Rue de Châteaudun, in the city of Paris, Republic of France, lapidary, have invented improvements in and relating to the preparation of a composition for use in the manufacture of artificial pearls and for similar purposes, of which the following is a full, clear, and exact description.

The present invention has for its object a pearly coating with a base consisting of the scales of the bleak and presenting a very brilliant aspect which is unaffected by moisture.

It is known that the commercial product termed "essence d'orient" is composed of ammoniacal water holding in suspension the scales of the bleak or other fish. Heretofore before mixing this essence d'orient with the liquid or the product which is to serve as a vehicle for it, it was allowed to become precipitated whereupon the precipitate thus obtained was simply separated by decantation from the floating liquid and mixed without any other operation with a solution of celluloid, collodion or gelatin. With collodion and celluloid a paste is obtained which furnishes a lusterless coating owing to the presence of water or other traces of moisture in the said paste. Accordingly the pearly coatings obtained in this manner have never been applicable commercially. With gelatin a product is obtained which is relatively brilliant but liable to alteration in water. The deposit obtained by simple decantation of the "essence d'orient" necessarily retains the ammoniacal water and that it is impossible to eliminate it by desiccation of the deposit because in this case the scales become agglomerated, harden and become useless.

The present process enables to obtain a very brilliant pearly coating, with a base of cellulosic varnish or products unaffected by water, such as resinous varnishes, waxes, paraffin, gutta-percha, rubber, etc. This process consists in dehydrating completely the scales of fishes either by means of successive decantations in a dehydrating liquid miscible with water, or by the heat, or still by means of a deliquescent salt or of a body capable of absorbing cold water without being dissolved. When it is desired to obtain the dehydration of the scales by decantation, the "essence d'orient" is allowed to become deposited then the floating liquid is decanted and replaced by distilled water or ordinary non-calcareous water. The substance is allowed to become deposited and decantation is again effected and the deposit of bleak scales is heated with acetone, ether, ethylic alcohol or methylic alcohol or any other volatile product which will not attack the scales and which is miscible with water. After intimate mixing by agitation the substance is again allowed to become deposited this taking place fairly rapidly because this commencement of dehydration changes the texture of the scales and their aspect and in diminishing their tendency to remain in suspension in the liquid. The mixture is again decanted and the deposit is treated with a fresh quantity of fresh more highly concentrated volatile liquid, for example acetone, absolute alcohol and so forth. The same operation is repeated as many times as necessary. The number of operations varies with the quantity of scales in the solution and the time during which the deposit has been allowed to take place. The residual liquids obtained from the last operations are kept for further use in other first washings. As a result of these successive treatments in dehydrating liquids a deposit of bleak scales is obtained which is absolutely free from moisture. This result may also be obtained by introducing the scales in acetone and in dehydrating the latter by means of deliquescent salts, such as calcium chlorid, which is placed in an open vessel immersed in acetone above the deposit of scales.

The calcium chlorid is liquefied in proportion as it absorbs the water of the mixture. It remains solid when the dehydration is complete. The calcium chlorid may be replaced by quick-lime. If the solvent used is a mixture of alcohol and ether, the deliquescent salt will be calcined carbonate of potash, acetate of potash, etc., products which do not combine with alcohol. It then only remains to mix the scales with a varnish or a fluid product intended to serve as a vehicle for the deposit. For example if it be desired to manufacture a coating with a base of celluloid, collodion, etc., the scales are mixed with a fluid solution of collodion or celluloid in acetate of amyl or any other volatile liquid capable of dissolving these substances. The mixture is effected by simple kneading. A fairly liquid paste is obtained and this when exposed for a short period to the air and then under the action of a desiccation bell loses the small quantity of volatile liquid alcohol, acetone, ether or the like retained between the scales of the deposit and frees the same from any trace of moisture. This paste which is absolutely anhydrous constitutes a brilliant pearly coating imparting to the materials to which it is applied the water and the luster of fine pearls and of mother of pearl.

It will of course be understood that the imitation pearls may be constituted by spheres of enamel, mother-of-pearl, opal, coral, marble or any other appropriate material. The coating may also be constituted of gutta-percha, rubber, lacquers, resins, paraffin or any vegetable or mineral waxes; the dehydrated scales are then mixed with a suitable liquid: bisulfid of carbon, benzin, mineral spirit, essence of turpentine, etc., dissolving these substances. This liquid is replaced by sulfid of carbon, when it is desired to employ a coating of indiarubber.

For the sake of economy after the first washing of the deposit with a volatile dehydrating liquid the operation set forth above may be carried out, the successive treatments being replaced by a rapid evaporation by means of heat. In this case care must be taken to employ a sufficient quantity of amyl acetate for preventing the scales from drying and thus losing their qualities. The water evaporates quicker than the amyl acetate which may be replaced by any other product the boiling point of which is higher than that of water; it should of course be understood that this liquid must not attack the scales and that it should be miscible with the product or liquid which is to serve as the vehicle for the coating.

Whatever method may be employed the coating preserves its lustrous aspect and is not altered by water.

In order to protect the solutions prepared beforehand against any cause of dehydration, it is useful to introduce in these solutions a product, such as gelatin, gelose, mucilages, which is not soluble in the solvents of nitrocellulose and of celluloid, but having the property to absorb cold water without being dissolved. The products indicated above may also be used for obtaining the dehydration of the scales of fishes.

The product prepared according to one of the methods which have been indicated may serve numerous purposes. As stated above it can be used for the manufacture of artificial pearls. It can also be applied to the most diverse articles such as the sticks of fans, bodies of opera glasses to fabrics, metals, papers and so forth. This coating may likewise be colored to any desired tint.

Claims:

1. A composition for a pearly coating consisting of the combination of dehydrated fish scales and a non-aqueous agglutinating substance.

2. A process for the preparation of a composition of a pearly coating, consisting in dehydrating scales of fish; in mixing the latter with a non-aqueous agglutinating substance.

3. A process for the preparation of a composition for a pearly coating, consisting in mixing essence d'orient with a dehydrating liquid miscible with water; in decanting and adding a new dehydrating liquid; in repeating such decantations and additions of dehydrating liquid until complete dehydration of the scales; in mixing the scales in suspension in the said dehydrating liquid with a non-aqueous agglutinating substance.

4. A process for the preparation of a composition for a pearly coating, consisting in mixing essence d'orient with a dehydrating liquid miscible with water; in adding a deliquescent salt to said liquid; in decanting and mixing the scales in suspension in the remaining liquid with a non-aqueous agglutinating substance.

The foregoing specification of my improvements in and relating to the preparation of a composition for use in the manufacture of artificial pearls and for similar purposes, signed by me this 28th day of September 1909.

CHARLES JEAN-BAPTISTE PAISSEAU-FEIL.

Witnesses:
D. M. MASON,
R. EHIRIOT.